March 26, 1957 — J. F. BERTSCH — 2,786,454
POWER STEERING CONTROL VALVE
Filed April 15, 1955
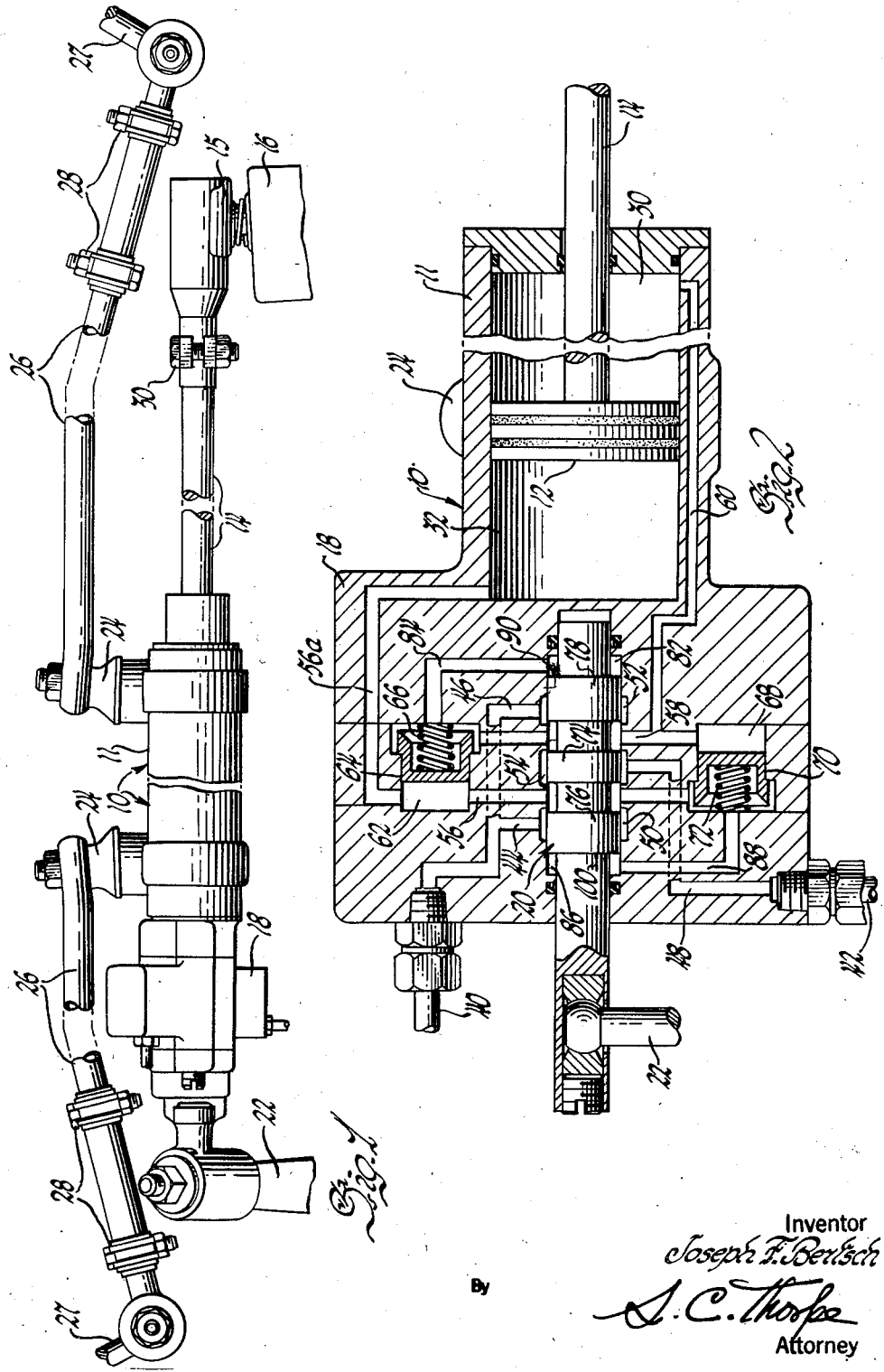
Inventor
Joseph F. Bertsch
By S. C. Thorpe
Attorney

United States Patent Office 2,786,454
Patented Mar. 26, 1957

2,786,454

POWER STEERING CONTROL VALVE

Joseph F. Bertsch, Detroit, Mich., assignor to General Motors Corporation, Detroit, Mich., a corporation of Delaware Application April 15, 1955, Serial No. 501,571

5 Claims. (Cl. 121—46.5)

This invention concerns a reaction valve, by which is meant a valve of the type employed in a servo system to control fluid flow to and from an actuator or fluid motor linked to a part desired to be actuated, the valve including means whereby pressure fluid is applied to impose a resistance to movement of a manually controlled valve part so as to create an artificial "feel." In its most particular aspect the invention concerns a valve of the indicated characteristics, which is especially adapted for use in the fluid power steering of automotive and similar vehicles.

As applied in a fluid power steering gear, the control valve for the fluid motor, which may be operatively connected to substantially any steering member, is manually actuated through the steering shaft, either directly or indirectly, the movement of the valve thus induced causing the development of a pressure differential across the piston in the motor so as to bring about the desired powered turning of the dirigible wheels. The source of the required fluid pressure is normally a suitable pump operated through a take off from the engine of the vehicle and connected to the valve directly or through an accumulator maintained at a predetermined pressure by the pump. Since the operator would otherwise lack an adequate sense of feel at the steering wheel assuring proper control of the vehicle, it is conventional to install in the valve or in association therewith means providing an artificial resistance to turning of the wheel. While such means may be purely mechanical as a spring, for instance, according to the better practice there is provided alone, or in addition to a spring, a pair of chambers adapted to be supplied with fluid from the valve inlet, these chambers representing the two directions of movement of the valve. Each chamber is defined in part by a yieldable wall integral with or operably associated with the movable component of the valve and providing a reaction surface for the fluid in the chamber. As the valve element is displaced so as to energize the fluid motor in the desired direction, the pressure in the corresponding chamber becomes the same as the line pressure, while the other chamber is opened to exhaust. Accordingly, if movement of the valve element is to continue, the pressure in the chamber under line pressure must be overcome, and this pressure is sensed at the steering wheel as steering resistance.

In the operation of such a system, it should be apparent on reflection that since the fluid providing the resistance sensed at the wheel is under a pressure corresponding to that prevailing in the motor and that since the pressure in the motor is a function of the steering resistance, the resistance to turning of the steering wheel will be greatest at maximum steering resistance and lowest at minimum steering resistance.

Although the foregoing represents a desideratum in that the sensed steering resistance or artificial feel is proportionate to the actual steering resistance within the significant range of vehicle speed, in order to provide an adequate feel in the higher portion of such range, the feel in the lower portion thereof has by necessity been made substantially higher than preferable. Thus, in the case of the conventional gears, there has been objection to the effort required at the steering wheel during parking and maneuvering in close quarters. This objection cannot be met simply by reducing the amount of fluid reaction at low speeds, for then the feel at higher speeds would be so faint as to possibly present a hazard.

The present invention aims to provide a reaction valve characterized in operation in that the reaction pressure is automatically reduced at low vehicle speeds.

Another object is to provide such a valve which enables an increase in the artificial resistance at higher speeds over that previously feasible.

Other objects and features of the invention will become apparent from the following description of a preferred embodiment thereof. The description will proceed with reference to the accompanying drawings in which:

Fig. 1 illustrates in plan a typical installation incorporating the valve herein; and Fig. 2 is a section wherein the valve in the interest of simplifying the description is represented in an essentially diagrammatic fashion.

Referring first to Fig. 1, the numeral 10 indicates a fluid motor comprising a power cylinder 11 having therein a piston 12 (Fig. 2), the shaft 14 of which is anchored to the vehicle frame 16 through a ball and socket connection 15 of conventional design. Integrated with the cylinder 10 is the housing portion 18 of a control valve including a spool 20 (Fig. 2) connected to the steering gear pitman arm 22 for actuation thereby.

The cylinder 10 has secured thereto two fixtures 24 providing connections for tie rods 26 each extending outwardly for connection to a steering knuckle arm 27. Parts 28 allow for lengthening or shortening of the tie rods as necessary. A similar device 30 provides for lengthening or shortening of the piston shaft 14.

It will be recognized that the installation illustrated represents a substitution of the combined motor and valve assembly 10, 14, and 18 for the usual center link in a parallelogram steering linkage. And it should be readily apparent that when pressure fluid is admitted to the right-hand end 30 of the power cylinder, the cylinder is caused to move rightward to swing the dirigible wheels, not shown, to the left; and that, conversely, if the left-hand end 32 of the cylinder is pressurized, the cylinder moves to the left, thereby to swing the dirigible wheels to the right.

Fluid for operation of the motor 10 enters the valve body 18 via line 40 which may be assumed as connected at its opposite end to the discharge port of a suitable power steering pump. With the valve spool 20 centered as shown, this position of the spool corresponding to the straight-ahead position of the dirigible wheels, the inlet fluid circulates through the valve against the static pressure of the fluid in the fluid motor and is returned to the pump, or a reservoir from which the pump draws, via conduit 42.

The valve housing is formed to provide branch inlet passageways 44 and 46, and an exhaust passageway 48 extending from annular channel 54 located between annular channels 50 and 52. In addition, the housing 18 comprises a power passageway 56, 56a extending to the left-hand end 32 of the cylinder 11 and a second power passageway 58 connecting with a passageway 60 through which fluid is passed to and discharged from the right-hand end 30 of the cylinder.

A chamber 62 traversed by fluid entering the left-hand end 32 of the cylinder 11 contains a valve element 64 biased leftward by a spring 66. Similarly, a chamber 68, which is open to passageways 58, 60 through which fluid is passed to the right end of the power cylinder, confines a valve element 70, biased rightward by a spring 72.

The valve spool 20 comprises a central land 74 and end lands 76 and 78. Outward of the land 78 is a chamber 82 communicating with the chamber 62 via a passageway 84. For a like purpose, a chamber 86 to the left of the end land 76 is interconnected via a passageway 88 with chamber 68. The fit of each of the lands 76 and 78 in the housing bore is such that substantial leakage past the land into the corresponding chamber 86, 82 may take place. The usual manufacturing tolerances may provide the necessary clearance between the land and the bore.

To describe now the operation of the system, let it be assumed that the valve spool 20 is displaced by the pitman arm 22 to the left as is the case on a right turn. This results in shifting of the land 78 so that the same blocks the annular channel 52 to prevent fluid flow to the right-hand end 30 of the power cylinder which end, however, remains open to the exhaust passageway 48. Simultaneously, the central land 74 enters a position causing blocking of fluid flow from the left-hand end 32 of the power cylinder to the exhaust passageway. The pressure reached by the fluid entering such end of the cylinder past the land 76, now further removed from its valving edge, is determined by the steering resistance, which as previously brought out is greatest during low speed travel.

As the valve spool is displaced to the left, part of the pressure fluid entering the annular channel 50 is diverted to the chamber 86 via the left hand portion of the chamber 68 and the passageway 88. The developing pressure in the chamber 86 operates as a resistance against the spool movement to the left, providing the "feel" hereinbefore described.

It is important to note that on leftward movement of the valve spool, substantial bleeding of pressure fluid past land 78 into the chamber 82 occurs. This bleed fluid, derived from passageway 46, has egress to exhaust via the passageway 84, the chamber 62, and the exhaust conduit 48.

The foregoing assumes that the steering resistance encountered in making the right turn is not such as to cause the development of a pressure in the chamber 62 sufficient to shift the valve element 64 rightward against the resistance of the spring 66. This condition obtains when the vehicle is traveling at speeds above, say 8–10 M. P. H. Now let it be assumed that the vehicle is being operated at a speed below the indicated range, i. e. is being parked or maneuvered in close quarters. Due to the increased steering resistance the pressure in the chamber 62 (the vehicle is being steered to the right as before) becomes substantially higher, with the result that the resistance of the spring 66 is overcome and fluid flow from chamber 82 to exhaust is blocked by the valve element 64. In other words, the fluid entering the chamber from the passageway 46 past the land 78 has no means of egress. Thus, there develops in the chamber 82 a substantial pressure which reacts on the annular surface 90 tending to further the leftward movement of the spool 20. This means that the resistance to leftward movement of the spool, ignoring friction, is the pressure in the chamber 86 less the pressure in the chamber 82, and such resistance is substantially less than obtains in the instance of prior fluid power steering gears under the indicated conditions.

The transition point of 8–10 M. P. H. mentioned above is, of course, purely arbitrary, since the spring 66 can readily be gauged so that the valve element 64 begins to close at a substantially lower or higher speed.

Once the speed of the vehicle increases to a point where the pressure developing in chamber 62 (still assuming a right turn) is less than the loading of spring 66, the latter operates to force the valve element 64 leftward to open the chamber 82 to exhaust, to the end that there is no appreciable subtraction from the resistance created by the pressure of the fluid in the chamber 86.

It should be obvious that in the negotiation of a left turn, the valve action will be just the opposite of that above described. In other words, should the steering resistance in a left turn be such that the line pressure increases to the selected value, valve element 70 will shift to the left against the resistance of the spring 72 to prevent exhaustion of fluid from the chamber 86, this fluid having bled into the chamber past the end land 76 from the passageway 44. The pressure consequently developing in chamber 86 by reaction against the annular surface 100 causes closing of the valve element 70 and aids or furthers the movement of spool 20 against the resistance of the pressure fluid in chamber 82.

It is important to note that at no time does the pressure favoring the spool movement reach a value equal to the pressure resisting the spool movement, this in view of the springs 66 and 72 and the fact that the effective surface available for fluid reaction is greater at the spring side of each valve 64, 70 than on the other side. To take a concrete example, let us assume some actual values, using rounded figures for simplicity, and say that spring 66 is of sufficient strength to maintain its valve in the open position until a line pressure of 300 p. s. i. is reached in a right turn. And let us assume further that the right or spring side of the valve affords twice as much area for reaction as the left side thereof. Now if the pressure in the line increases to 400 p. s. i., it should be apparent that a pressure of only half the difference between 400 and 300 p. s. i. or 50 p. s. i. would be needed in the circuit including chamber 82 to balance valve 64. Any pressure in excess of 50 p. s. i. in such circuit would cause the valve to open sufficiently to maintain the 50 p. s. i. level. This relation would then hold true throughout the rest of the range so that at parking loads, where 600 p. s. i. cylinder pressures are generally required, the pressure in the left hand reaction chamber 86 would be 600 p. s. i., but a pressure of (600–300)/2 or 150 p. s. i. would be opposing in the right hand chamber, resulting in a net reaction on the spool of 450 p. s. i.

The booster herein will be recognized as having a follow-up action. Thus, in a turn, the housing 18 of the control valve, being fixed to the cylinder, tends constantly to re-center itself with respect to the spool 20 so that with cessation of the effort at the steering wheel the steering action is immediately arrested and the dirigible wheels are restored to their straight ahead position by the geometry of the steering linkage, just as in the case of an ordinary mechanical steering system.

I claim:

1. A reaction valve adapted for fluid power steering and other applications comprising, a pair of telescopically related members one of which is movable in two directions relative to the other, the said other member having therein an inlet port, an exhaust port and a pair of power ports, means defining a pair of chambers adapted to confine bodies of fluid under varying pressure operating to impose a resistance to movement of said movable member, one of said chambers being effective in one direction of movement, the other being effective in the other direction of movement, and means coming into play on the development of a predetermined quantum of pressure in either of said chambers whereby the other chamber becomes pressurized to a predetermined extent thereby to further the movement of said movable member against the imposed fluid resistance.

2. A valve according to claim 1 where the fluid for said chambers is derived through said inlet port.

3. A reaction valve adapted for fluid power steering and other applications comprising, a pair of telescopically related members the inner of which is axially movable in two directions relative to the outer, the outer member having therein an inlet port, an exhaust port and a pair of power ports, means defining a pair of chambers communicating with said inlet port and adapted to confine bodies of fluid under varying pressure operating to impose a resistance to movement of said movable member, one of said chambers being effective in one direction of movement, the other being effective in the other direction of movement, and means coming into play on the development of a predetermined quantum of pressure in either of said chambers whereby the other chamber becomes pressurized to a predetermined extent thereby to further the movement of said movable member against the imposed fluid resistance.

4. A reaction valve adapted for fluid power steering and other applications comprising, a pair of telescopically related members the inner of which is axially movable in two directions relative to the outer, the outer member having therein an inlet port, an exhaust port and a pair of power ports, means defining a pair of chambers, one at each end of said inner member, communicating with said inlet port and adapted to confine bodies of fluid under varying pressure operating to impose a resistance to movement of said axially movable member, one of said chambers being effective in one direction of movement, the other being effective in the other direction of movement, and means coming into play on the development of a predetermined quantum of pressure in either of said chambers whereby the other chamber becomes pressurized to a predetermined extent thereby to further the movement of said movable member against the imposed fluid resistance.

5. A reaction valve adapted for fluid power steering and other applications comprising, a pair of telescopically related members the inner of which is axially movable in two directions relative to the other, the outer member having therein an inlet port, an exhaust port and a pair of power passageways, means defining a pair of chambers, one at each end of said inner member, adapted to confine bodies of fluid under varying pressure operating to impose a resistance to movement of said axially movable member, one of said chambers being effective in one direction of movement, the other being effective in the other direction of movement, means providing separate fluid supply passageways between said inlet port and each chamber, said fluid supply passageways serving also as exhaust passageways, means providing a pair of conduits, each interconnecting one of said fluid supply passageways and one of said power passageways, a valve element in each conduit having a first reaction surface subject to the fluid in the corresponding fluid supply passageway and a second reaction surface subject to the fluid in the corresponding power passageway, said element having biasing means associated therewith exerting an additive effective with respect to said first reaction surface, and means providing a bleed connection between said inlet port and each said chamber whereby on movement of said movable member, pressure fluid enters the chamber disposed opposite the direction of the movement as well as the chamber disposed in the direction of movement, said reaction valve being characterized in operation in that on the development of a predetermined quantum of pressure in the chamber disposed in the direction of movement, the corresponding valve element becomes closed so that the fluid in the chamber disposed opposite the direction of movement builds up to further the movement of said movable member.

References Cited in the file of this patent

UNITED STATES PATENTS 2,719,511    Presnell _____ Oct. 4, 1955